United States Patent [19]

Sida

[11] 4,316,681
[45] Feb. 23, 1982

[54] BLENDING EQUIPMENT
[75] Inventor: Shozo Sida, Aichi, Japan
[73] Assignee: Sansho Kabushiki Kaisha, Japan
[21] Appl. No.: 62,274
[22] Filed: Jul. 30, 1979
[30] Foreign Application Priority Data
Jul. 31, 1978 [JP] Japan ................................. 53-93476
[51] Int. Cl.³ ............................................ B65G 53/40
[52] U.S. Cl. .................................. 406/162; 406/163; 406/165; 414/301
[58] Field of Search ............... 406/162, 163, 164, 165, 406/166; 414/172, 199, 206, 300, 301; 366/150

[56] References Cited
U.S. PATENT DOCUMENTS

| | | | |
|---|---|---|---|
| 1,787,261 | 12/1930 | Reinke | 406/162 X |
| 1,839,749 | 1/1932 | Ewing | 406/162 X |
| 1,885,828 | 11/1932 | Houghton | 406/162 X |
| 3,682,394 | 8/1972 | Shivvers | 414/301 X |
| 3,814,403 | 6/1974 | Legille | 414/206 X |
| 3,851,927 | 12/1974 | Weichel | 414/301 X |
| 3,864,984 | 2/1975 | Legille | 414/301 X |
| 3,921,831 | 11/1975 | Takahashi et al. | 414/206 |
| 3,963,128 | 6/1976 | Voituriez et al. | 414/206 X |

Primary Examiner—James L. Rowland
Attorney, Agent, or Firm—William A. Drucker

[57] ABSTRACT

A blending equipment mounted on the ceiling of a blending bin has a conveyor airduct for introducing materials or raw cotton from the exterior of the blending bin into the interior thereof. The conveyor airduct has a lower end with which one end of a spreader outlet is communicated, the other end of the spreader outlet being opened laterally within the blending bin. The opening of the spreader outlet turns round a vertical axis. A lower member of the spreader outlet defining the opening is moved up and down. Rotation of the spreader outlet and oscillation of the lower member of the spreader outlet are effected simultaneously. Thus, the materials fed into the blending bin through the conveyor airduct are evenly scattered from the opening of the spreader outlet not only at a position below the blending equipment but also set positions more remote therefrom.

1 Claim, 4 Drawing Figures

BLENDING EQUIPMENT

BACKGROUND OF THE INVENTION

1. Field of the Invention

This invention relates to a blending equipment adapted to mix various sorts of raw cotton in a blending process of a cotton spinning system.

2. Description of the Prior Art

In the conventional blending equipment, there is a lower conveyor airduct suspended from the ceiling of a blending bin, and an outlet directed laterally of the airduct is turned relative to the peripheral wall like a cycle fan so that materials are scattered out of the outlet.

In the case of such an arrangement as described above, the materials spread from the outlet into the blending bin are accumulated in a ring-like manner on the floor (as indicated at C' in FIG. 3) or accumulated in a one-sided manner close to the peripheral wall (as indicated at C" in FIG. 3). Consequently, in the orderly clearing away of cotton accumulated within the blending bin from side edges thereof and preparing it to produce the prepared cotton, the ratio of mixture becomes uneven in various portions.

SUMMARY OF THE INVENTION

It is therefore an object of the present invention to provide a blending equipment which in scattering and accumulating materials or raw cotton within a blending bin, can accumulate materials in uniform thickness in a central portion and even in corners within the blending bin.

If the materials can be accumulated in uniform thickness, when various sorts of materials are successively scattered, any of these materials are uniformly accumulated in a layer manner. Accordingly, when a stack of layered materials are prepared by orderly clearing them away from side edges thereof, they always assume a uniform prepared condition.

DESCRIPTION OF THE PREFERRED EMBODIMENT

Figure 1:
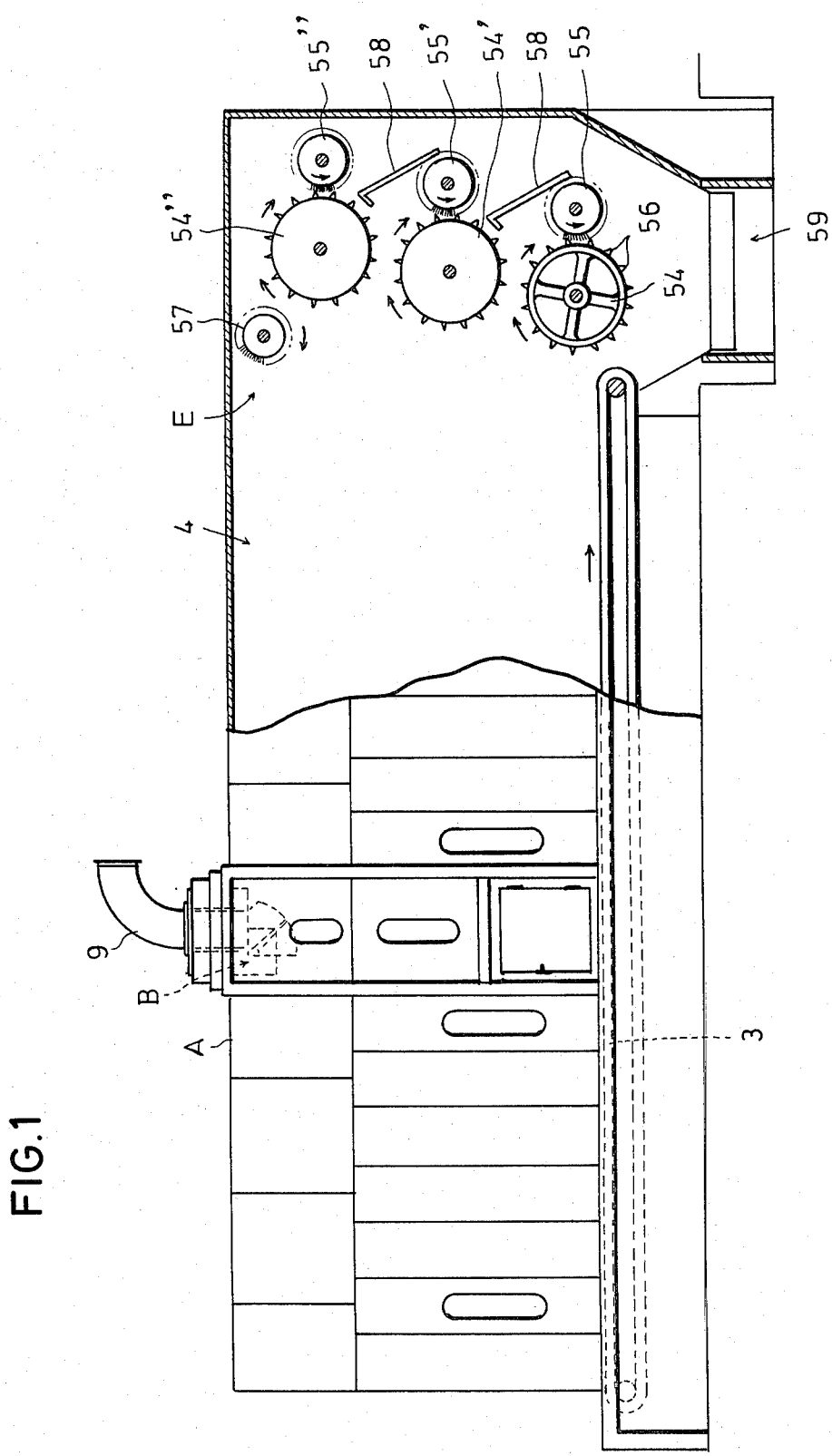
FIG. 1 is a front view showing a blending bin provided with a blending equipment and a removing device associated with said blending bin.
Figure 2:
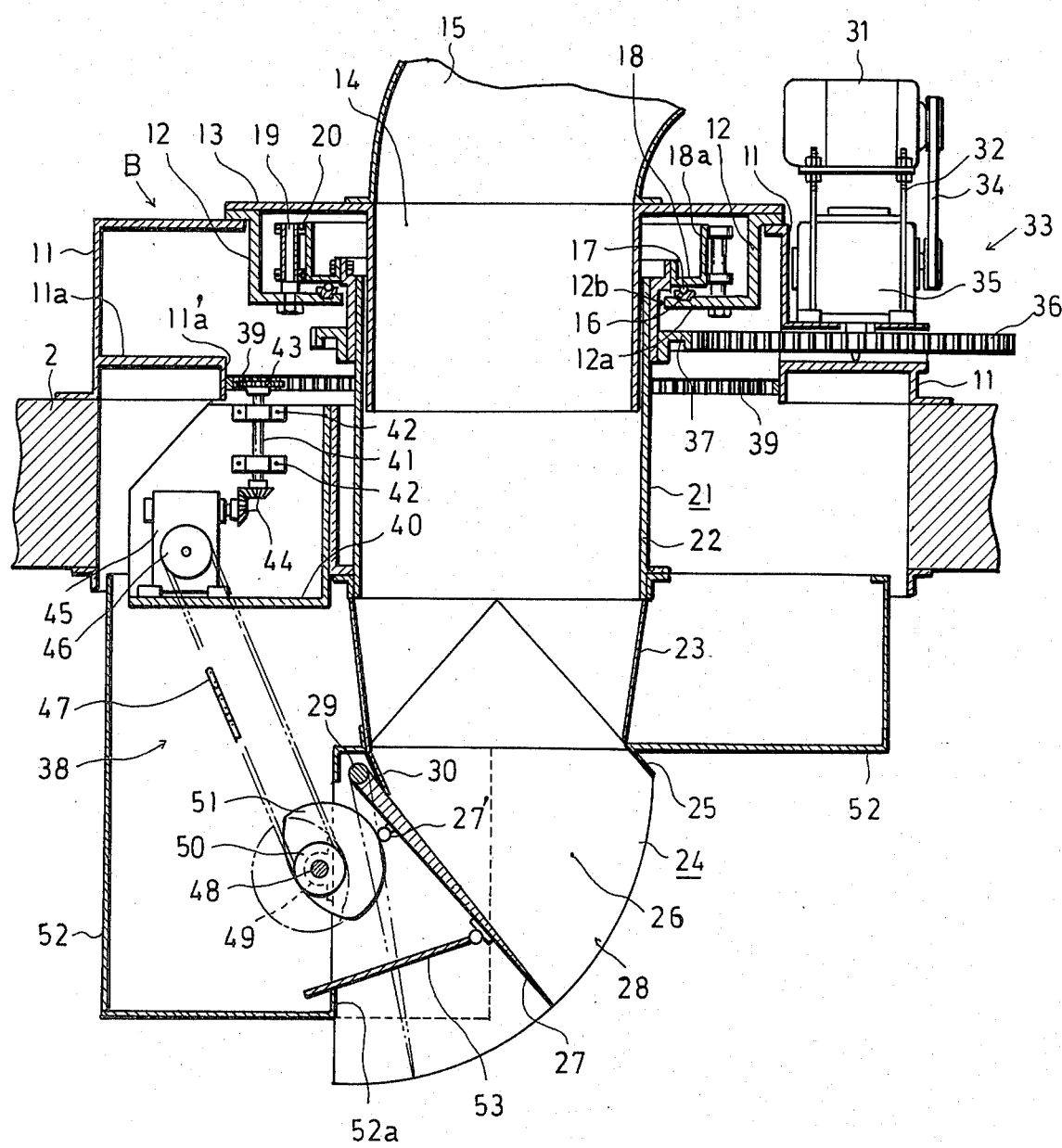
FIG. 2 is an enlarged sectional view of the blending equipment.

In the drawings, a blending bin A is composed of a peripheral wall 1, a ceiling 2, and a floor 3. The peripheral wall encircles three sides of the blending bin A. The remaining one side of the bin is open to serve as an outlet for cotton accumulated within the blending bin A. The floor 3 comprises a conveyor moving in a direction as indicated by the arrow by which accumulated materials may be delivered.

The ceiling 2 has a blending equipment B disposed in a central portion thereof. The blending equipment comprises a support including frames 11, 12, and 13. The frame 13 is formed with a communicating cylinder 14 integral therewith. The communicating cylinder 14 is communicated with an upper conveyor airduct 15 secured to the frame 13. A bearing race 16 is secured to a bottom plate 12a of the frame 12. A rotary frame 18 may be freely rotated relative to the frame 12 through a number of bearing balls 17 placed on the bearing race 16. The rotary frame 18 has an annular plate to be guided 18a. A number of shafts 19 are stood upright on the bottom plate 12a of the frame 12. These shafts 19 are positioned on one and the same circumference about the rotary frame 18. The shafts 19 are each provided with a guide roller 20. The plate to be guided 18a comes to contact the guide rollers 20 so that movement of the former may be guided. Thus, the rotary frame 18 is rotated at a fixed position relative to the frame 12.

Mounted on the rotary frame 18 is a conveyor airduct 21. The conveyor airduct 21 comprises a body 22 and an extended cylinder 23 connected to the lower end of the body 22. A spreader outlet 24 is communicated with the lower end of the conveyor airduct 21 or the lower end of the extended cylinder 23. The spreader outlet 24 comprises an upper member 25, a side plate 26, and a lower member 27, all defining a spreading port 28 is directed laterally as shown. The base of the lower member 27 is attached to a shaft 29 supported on the side plate 26. Thus, the lower member 27 can be tilted to move the lower boundary of the spreading port 28 up and down to vary the cross-section, and the direction of discharge of, the port relative to the horizontal. A cover 30 mounted on the lower end of the extended cylinder 23 covers the base of the lower member 27 so that the cotton downwardly moving through the conveyor airduct 21 may be guided into the spreader outlet 24 smoothly. This cover 30 is formed of a soft and elastic material such as rubber sheet, steel sheet and the like.

A motor 31 is mounted on the frame 11 through support rods 32. Between the motor 31 and the rotary frame 18 is interposed a transmission mechanism 33 to transmit rotation of the motor 31 to the rotary frame 18. Transmission mechanism 33 comprises a belt 34, a reduction gear 35, a drive gear 36 mounted on an output shaft of the reduction gear 35, and a driven gear 37 mounted on the rotary frame 18 and meshed with the drive gear 36. As an example, a circular spur gear is used for the drive gear 36 and driven gear 37.

Next, a shifting mechanism 38 for tilting the lower member 27 of the spreader outlet 24 will be described. The frame 11 has an auxiliary frame 11a mounted on an inner peripheral side thereof. The auxiliary frame 11a has an annular wall 11a' coaxial about the rotary frame 18. The wall 11a' is provided with an internally toothed gear ring 39 over the entire periphery of the inner peripheral surface thereof.

On the other hand, a small frame 40 for the shifting mechanism is mounted on the body 22 of the conveyor airduct 21. A vertical shaft 41 is rotatably mounted on the small frame 40 by means of bearings 42 and 42. A gear 43 is mounted on the upper end of the vertical shaft 41. This gear 43 is meshed with the ring 39. The frame 40 further has a reduction gear 45, an input shaft of which is associated with the lower end of the vertical shaft 41 through a pair of bevel gears 44. A chain sprocket 46 is mounted on the output shaft of the reduction gear 45. The spreader outlet 24 has opposite side plates 26 on which bearings 49 are respectively mounted. The bearings 49 rotatably support a shaft 48. A sprocket 50 is mounted on the shaft 48, and a chain 47 is passed over between the sprocket 50 and the sprocket 46. The shaft 48 further has a cam 51 mounted thereon. A roller 27' mounted on the lower surface of the lower member 27 bears on the outer peripheral surface of the cam 51. Consequently, when the cam 51 rotates, the lower member 27 oscillates up and down.

The underside of the tilting mechanism 38 and transmission mechanism 33 is covered with a cover 52 mounted on the extended cylinder 23 and side plate 26. A shield plate 53 is tiltably mounted on the lower side of the lower member 27 of the spreader outlet 24. The foremost end of the shield plate 53 always remains stayed on an upwardly bended portion 52a of the cover 52 even if the bottom plate 27 should be oscillated so as to prevent the cotton spread from the spreader outlet 24 from being plunged into the tilting mechanism 38.

The operation of the device will now be described.

When the motor 31 is driven, rotative force thereof is transmitted to the rotary frame 18 through the belt 34, reduction gear 35, drive gear 36 and driven gear 37, whereby the rotary frame 18 rotates. The conveyor airduct 21, spreader outlet 24, tilting mechanism 38 and cover 52 also rotate together with the rotary frame 18.

This rotation causes the gear 43 to rotate while being meshed with the ring 39. This rotation of the gear 43 is transmitted to the cam 51 through the vertical shaft 41, a pair of bevel gears 44, reduction gear 45, chain 47, shaft 48 and the like to rotate the cam 51. Thus, the lower member 27 moves up and down in concert with rotation of the cam 51.

In such a condition, when the materials are fed through the upper conveyor airduct 15, the materials pass through the communicating cylinder 14 and conveyor airduct 21 and are scattered from the spreader outlet 24 over the floor 3 of the blending bin A. In this case, since the conveyor airduct 21 is rotated, the spreading port 28 of the spreader outlet 24 is turned in direction. Also, since the lower member 27 also oscillates up and down during the course of such turning, the blow-off direction of materials from the spreading port 28 also changes within the range from obliquely downward direction to substantially downward direction.

Figure 3:
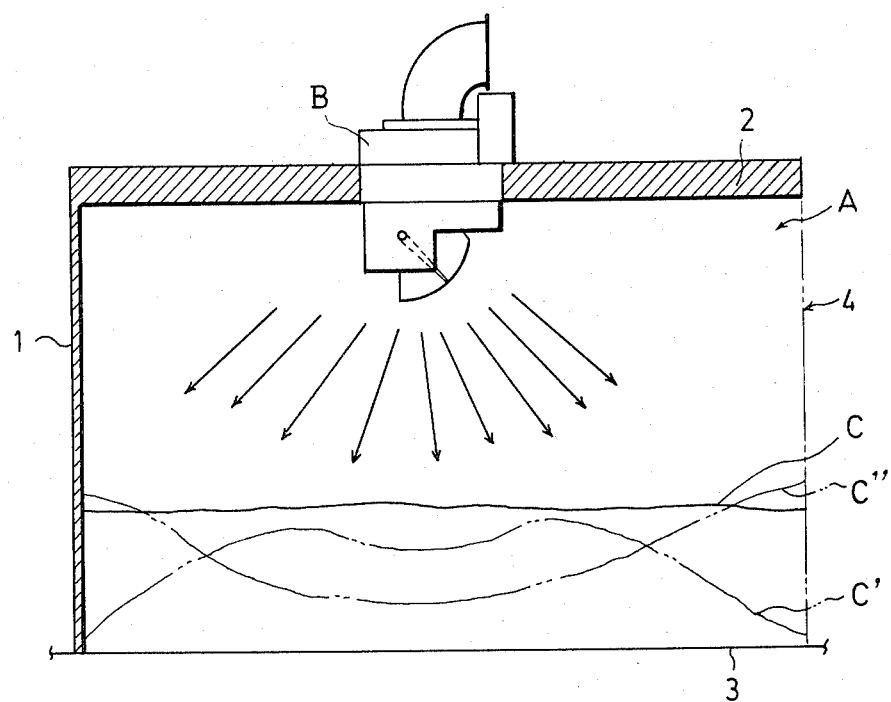
FIG. 3 is a longitudinal sectional view showing how materials are accumulated in the blending bin.

Because of this, the materials blown off from the spreading port 28 are accumulated in uniform thickness at a position directly under the blending equipment B on the floor 3 of the blending bin A as well as at positions away from the blending equipment B at the corners of the blending bin A, as shown at C in FIG. 3.

The materials accumulated on the floor 3 as described above are delivered through the outlet 4 by movement of the floor 3 and then taken out by the illustrated removing device E or suitable other removing means.

The removing device E in the present embodiment operates as follows. The materials on the conveyor in the form of the floor 3 are transferred onto a pin cylinder 54 which rotates in a direction as indicated by the arrow. Then, the materials are partly cleared away by means of needle-like protrusions 56 planted on the outer peripheral surface of the pin cylinder 54 and pass through a clearance between the pin cylinder 54 and a pin cylinder 54' disposed thereabove toward a beater roller 55. Then, the materials are driven away from the pin cylinder 54 by the beater roller 55 and fall into the outlet 59.

On the other hand, those materials not cleared away by the protrusions 56 on the pin cylinder 54 stay on the pin cylinder 54' thereabove. In this case, the materials are cleared away by the protrusions 56 on the lower pin cylinder 54, and as a result, an upper layer of materials out of the accumulated materials is drawn towards the upper pin cylinder 54'. Accordingly, the upper layer of materials is smoothly transferred onto the upper pin cylinder 54'. In this manner, the materials on the pin cylinder 54' are partly cleared away by the protrusions 56' on the pin cylinder 54' similarly to the former and move through a clearance between the pin cylinder 54' and the uppermost pin cylinder 54'' towards a beater cylinder 55'. Then, the materials are driven away by the beater roller 55' and guided by the guide plate, falling into the outlet 59.

Similar function is carried out by the uppermost pin cylinder 54'' and a beater roller 55''. It is noted that an evener roller 57 is provided to control the quantity of materials cleared away by the pin cylinder 54'' in a known manner.

Figure 4:
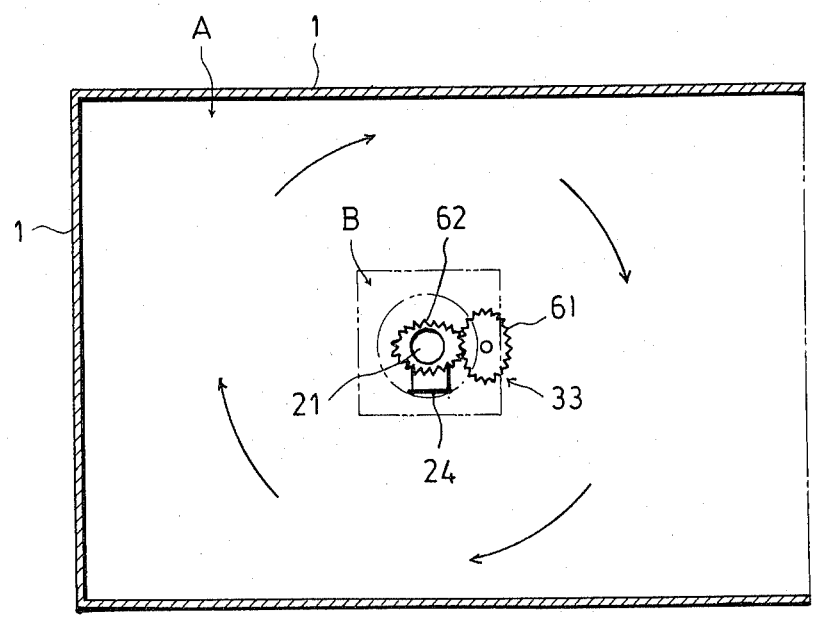
FIG. 4 shows the relationship between the shape of the blending bin and the shape of gears in a transmission mechanism.

FIG. 4 shows an embodiment in which modified gears are incorporated into the transmission mechanism 33 of the blending equipment B. A pair of elliptic gears 61, 62 are used in place of the aforementioned drive gear 36 and driven gear 37, respectively. Even if the blending bin A is, in plan, a rectangle as shown or various other shapes, the materials can be accumulated uniformly within the blending bin by employment of such modified gears as described above.

What is claimed is:

1. A blending equipment comprising:
   (i) a support for mounting on a central portion of a ceiling of a blending bin,
   (ii) a vertical conveyor airduct carried by said support for rotation about a vertical axis,
   (iii) motor means, and a transmission means connecting said motor means to said airduct for rotating said airduct relative to said support, said transmission means including meshed elliptic gears coupled respectively to said motor means and to said airduct such that the angular speed of said airduct varies cyclically during each rotation of said airduct,
   (iv) a spreader outlet secured to and rotatable with said airduct, said outlet having a first end opening and a second end opening, said first end opening communicating with said airduct, said second end opening being directed laterally, said outlet including a lower member defining a lower boundary of said second end opening, said lower member being movable for movement up and down of said lower boundary thereby to vary the cross-section, and the direction of discharge relative to the horizontal, of said second end opening,
   (v) shifting means carried by said airduct and serving to move said lower member up and down as said airduct is rotated.

* * * * *